Dec. 6, 1938.  A. E. THOMAS  2,139,609

TYING KNIFE

Filed June 24, 1937

Inventor

A. E. Thomas

By L. F. Randolph

Attorney

Patented Dec. 6, 1938

2,139,609

UNITED STATES PATENT OFFICE 2,139,609

TYING KNIFE

Adelbert E. Thomas, Rockland, Mass.

Application June 24, 1937, Serial No. 150,195

4 Claims. (Cl. 30—127)

This invention relates to an improved knife to be used in tying meat but it is also adapted for any other type of work where twine or the like is employed for tying or similar purposes.

Those who are employed in tying meat or packages find that their right hand is kept raw from gripping the twine. Various methods such as wrapping the twine around the handle of a knife, have been tried to prevent injury to the hand but without much success.

The object of this invention is to provide a tool whereby twine or the like can be held by gripping the handle while it is being tied and providing the tool with a blade by which the twine can be cut after being tied.

A further object of the invention is to provide clamping means formed within the handle to prevent the twine slipping while it is being tied.

Other objects and advantages of the invention will hereafter become more fully apparent from the following specification of which the drawing forms a part, and wherein:—

Figure 1:
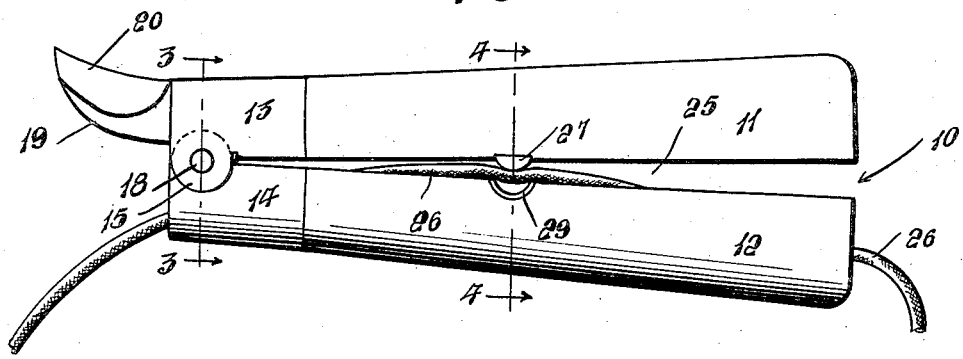
Figure 1 is a side elevation of the invention.

Referring more particularly to the drawing wherein like reference characters designate like or corresponding parts in the different views, 10 designates generally the handle comprising the sections 11 and 12. Secured around one end of the sections 11 and 12 are collars 13 and 14 respectively provided with overlapping ears 15 and 16 respectively. Ears 15 and 16 are provided with alined openings 17 to receive a pin 18 to pivotally connect sections 11 and 12.

Secured in one end of section 11 is a blade 19 having a cutting edge 20 and a reduced shank portion 21 secured in a recess 22 in section 11.

Figure 2:
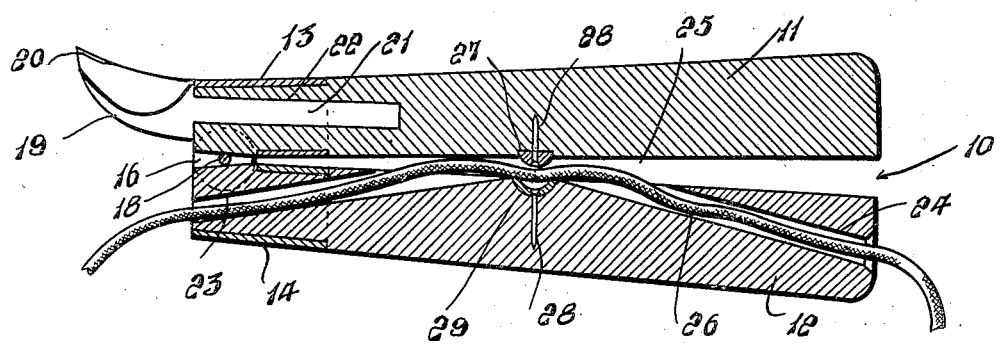
Figure 2 is a central vertical sectional view of the same.
Figure 3:
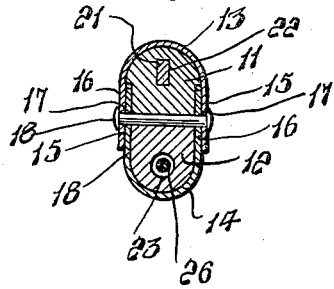
Figure 3 is a cross sectional view on the line 3—3 of Figure 1.
Figure 4:
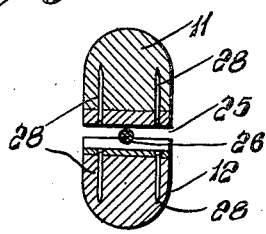
Figure 4 is a cross sectional view on the line 4—4 of Figure 1.

Section 12 is provided with two bores 23 and 24 which extend from each end of the section 12 at an incline and which communicate with the space 25 between sections 11 and 12. Twine 26 extends through bores 23 and 24 and through a portion of space 25 as best seen in Figure 2.

Secured to one side of section 11 and extending into space 25 is an elongated convex member 27 held by any suitable means such as driven fastenings 28. Secured to the corresponding side of section 12 is a concave member 29 shaped to receive member 27 and likewise held by fastenings 28. The members 27 and 29 are positioned between the inner ends of the bores 23 and 24 so that twine 26 must pass between them.

When handle 10 is held loosely twine 26 can be pulled through handle 10. By tightly gripping the handle 10 twine 26 will be clamped between members 27 and 29 so that the twine 26 can be tied and by swinging the blade 19 downwardly and inwardly cutting edge 20 will engage twine 26 to cut the twine beyond the knot that has been tied. The grip on handle 10 can be released to allow more twine to be drawn through bores 23 and 24. Twine 26 is drawn into section 12 through bore 24. Throughout the specification 26 has been referred to as twine, but obviously rope or cord or the like could be used depending upon the size of the tool and the requirements of the work to be done.

It is to be understood that only the preferred embodiment of the invention has been shown and described, the right being reserved to make such changes and modifications as do not depart from the spirit and scope of the invention as claimed.

I claim as my invention:—

1. A twine cutter and holder comprising a handle having a blade mounted in one end thereof, said handle comprising a pair of sections pivotally connected at one end, one of said sections being provided with inclined bores each communicating with the space between said sections, and clamping means formed on the sections between said bores to clamp the twine which passes between said sections.

2. A twine cutter and holder comprising a handle portion to support a cutting blade and to clamp the twine to be cut by the blade; said handle comprising a pair of sections pivotally connected at one end, one of said sections being provided with inclined bores communicating with the space between the sections, and a convex clamping member mounted on one section to engage a concave member on the other section between said bores, to clamp the twine threaded through the bores while it is being tied and cut.

3. A tying knife comprising a handle portion formed of spaced sections between which twine is adapted to be threaded, a cutting blade mounted on one end of said handle, a convex member secured to one of said sections and extending into the space between the sections, and a concave member mounted in the other section and opening into said space to receive said convex member, the twine adapted to pass between said concave and convex members and to be clamped therein.

4. A tying knife comprising a handle formed of pivotally connected sections, a cutting blade mounted on one end of said handle, and clamping means comprising a convex member mounted on one section to engage a concave member on the other section, said sections adapted to receive twine to be clamped between said concave and convex members while being cut by the blade.

ADELBERT E. THOMAS.